United States Patent [19]

Cantor

[11] 3,789,242

[45] Jan. 29, 1974

[54] OVERVOLTAGE AND UNDERVOLTAGE DETECTION CIRCUIT

[75] Inventor: Barry Ira Cantor, Boonton, N.J.

[73] Assignee: Bell Telephone Laboratories, Incorporated, Murray Hill, Berkeley Heights, N.J.

[22] Filed: Dec. 26, 1972

[21] Appl. No.: 318,619

[52] U.S. Cl. ............... 307/235 R, 323/40, 328/146, 340/248 B, 340/248 C

[51] Int. Cl. ........................... H03k 5/20, H03k 5/18

[58] Field of Search ........... 307/235 R, 243; 323/40; 328/146, 147, 148; 317/31; 324/72.5, 133; 330/30 D; 340/248 A, 248 B, 248 C

[56] References Cited

UNITED STATES PATENTS

| | | | |
|---|---|---|---|
| 3,626,214 | 12/1971 | Wesner | 307/235 R X |
| 3,573,638 | 4/1971 | Cox, Jr. et al. | 307/235 R X |
| 3,139,562 | 6/1964 | Freeborn | 307/235 X |
| 3,311,907 | 3/1967 | Teal | 307/235 X |
| 3,449,737 | 6/1969 | Stewart | 340/248 C |
| 3,457,560 | 7/1969 | McKinley | 307/235 X |
| 3,489,920 | 1/1970 | Moore et al. | 317/31 X |
| 3,517,215 | 6/1970 | Richer | 307/235 R |

OTHER PUBLICATIONS

Loesch et al., "Undervoltage/Overvoltage Detect Circuit", IBM Tech. Discl. Bull., Vol. 13, No. 6, p. 1557–1558; 11/1970.

Duspiva, "Overvoltage Sense Circuit", IBM Tech. Discl. Bull., Vol. 14, No. 40, p. 1244–1245, 9/1971.

Chaloypka et al., "Differential Threshold Detector Circuit", IBM Tech. Discl. Bull., Vol. 14, No. 2, p. 401–402, 7/1971.

Mattson et al., "Overvoltage/Undervoltage Protection Circuit", IBM Tech. Discl. Bull., Vol. 13, No. 10, p. 2894–2895; 3/1971.

*Primary Examiner*—Rudolph V. Rolinec
*Assistant Examiner*—L. N. Anagnos
*Attorney, Agent, or Firm*—H. L. Logan

[57] ABSTRACT

An overvoltage and undervoltage detector circuit is disclosed in which two reference voltage producing circuits have their dissimilar outputs applied to first and second input terminals of a voltage comparator. The dissimilarity of the inputs to the comparator is reversed when a first voltage exceeding a predetermined level forward biases a first diode and raises the potential on one of the comparator input terminals or a second voltage less than a predetermined level forward biases a second diode and lowers the potential on the other comparator input terminal.

2 Claims, 2 Drawing Figures

| CASE | TERMINALS | | | | |
|---|---|---|---|---|---|
| | 20 | 21 | 24 | 25 | 22 |
| 1 | >3V. | <3.5V. | 3.5V. | 3V. | ZERO |
| 2 | <2.5V. | <3.5V. | <3V. | >3V. | ONE |
| 3 | >3V. | >4V. | 3.5V. | >3.5V. | ONE |
| 4 | <2.5V. | >4V. | <3V. | >3.5V. | ONE |

OVERVOLTAGE AND UNDERVOLTAGE DETECTION CIRCUIT

BACKGROUND OF THE INVENTION

1. Field of the Invention

The invention relates to circuits used for signaling the deviation of a voltage level from within a predetermined range.

2. Description of the Prior Art

Various overvoltage and undervoltage detecting circuits are found in the prior art. In many cases, each of these circuits uses a pair of voltage comparators where one of the comparators functions to detect the overvoltage condition and the other functions to detect the undervoltage condition. The expense of such circuits would be reduced and their reliability improved if one of the voltage comparators could be eliminated.

SUMMARY OF THE INVENTION

An object of the invention is to use a single voltage comparator to detect overvoltage and undervoltage conditions.

This and other objects are achieved in accordance with the invention by applying two reference voltages as inputs to a voltage comparator. These inputs to the comparator have dissimilar amplitudes which cause the comparator to produce a first type of output. The dissimilarity of the comparator inputs is reversed when a first voltage exceeding a predetermined level forward biases a first diode connected to one of the comparator input terminals. The dissimilarity of the comparator inputs is also reversed when a second voltage less than a predetermined level forward biases a second diode connected to the other comparator input terminal. Reversing the dissimilarity of the comparator inputs causes the comparator to produce a second type of output. These latter voltages may be derived from a voltage divider connected across a source to be monitored, in which case the second type of output from the comparator is indicative of an out-of-range condition.

The present invention, therefore, uses a single voltage comparator in such a manner that it in effect measures a voltage to be monitored against two reference voltage levels. That is, when detecting an overvoltage, a first input terminal of the comparator receives an input voltage and a second terminal receives a reference voltage. On the other hand, when detecting an undervoltage, the first input terminal receives a reference voltage while the second terminal receives an input voltage. This unique use of the comparator and reference voltages permits a single comparator to be used in applications where, in the past, a pair of comparators were required.

DESCRIPTION OF THE DISCLOSED EMBODIMENT

Figures 1, 2:
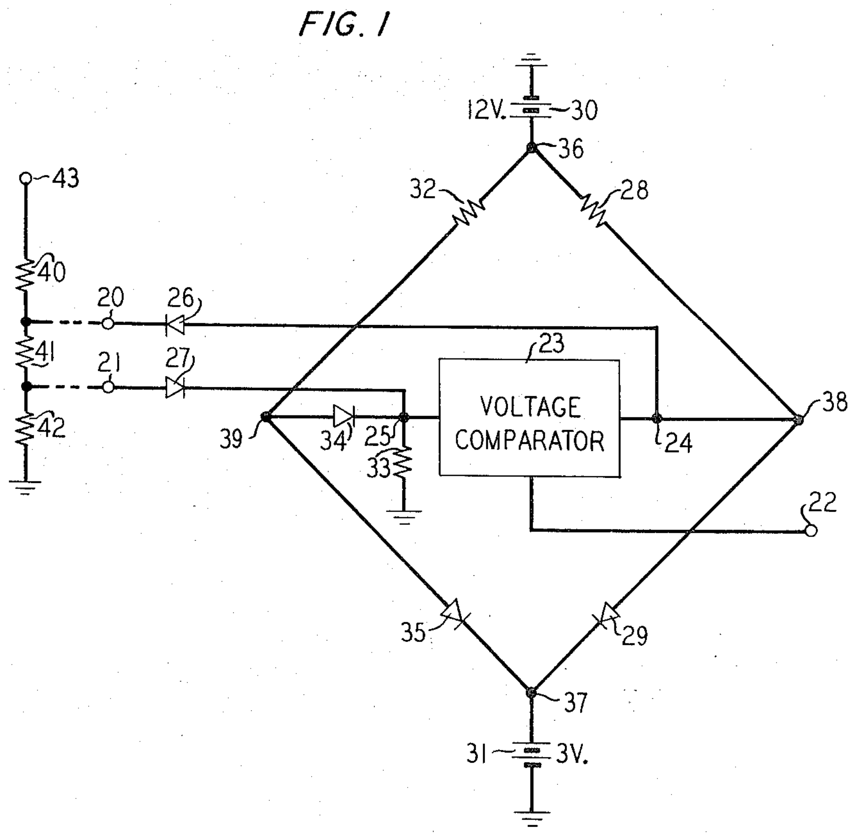
FIG. 1 discloses a schematic diagram of an embodiment of the invention.
FIG. 2 discloses a truth table useful in understanding the operation of the embodiment disclosed in FIG. 1.

The embodiment of FIG. 1 includes a pair of input terminals 20 and 21 and an output terminal 22. Also included in the embodiment is a voltage comparator 23 which has a pair of input terminals 24 and 25 connected to input terminals 20 and 21 by diodes 26 and 27, respectively. Diode 26 is poled for easy current flow toward terminal 20 while diode 27 is poled for easy current flow away from terminal 21. Still further included in the embodiment is a first reference voltage source comprising a resistor 28, a diode 29, and direct-current sources 30 and 31. The output of this reference voltage source is applied to comparator terminal 24. Finally, a second reference voltage source comprising resistors 32 and 33, diodes 34 and 35, and sources 30 and 31 is provided for applying a potential to comparator terminal 25.

As is discussed subsequently, the potential on comparator terminal 24 normally exceeds the potential on terminal 25. Under this condition the comparator produces a particular output on terminal 22 which, for purposes of discussion, is referred to herein as a ZERO output or state. A ONE output or state appears at this terminal when the inputs to terminals 24 and 25 are changed so that the potential on terminal 25 exceeds that on terminal 24. Such a comparator may take any one of a number of forms. It may, for example, comprise a transistor amplifier in which the transistor base and emitter electrodes are connected to terminals 24 and 25 so that the transistor is normally biased off.

The reference voltage sources are connected and function in the following manner. With respect to a point of ground potential, direct-current source 30 provides 12 volts at a terminal 36 while direct-current source 31 provides 3 volts at a terminal 37. (All voltages are positive with respect to ground unless otherwise stated.) Resistor 28 and diode 29 are connected in series and in that order between terminals 36 and 37 with the diode poled for easy current flow toward terminal 37. The junction between resistor 28 and diode 29 has been identified as terminal 38. This terminal, which makes available the output from the first reference voltage source, is connected to comparator input terminal 24. In a similar manner resistor 32 and diode 35 are serially connected between terminals 36 and 37 with diode 35 poled for easy current flow toward terminal 37. The junction between these two elements has been identified as terminal 39. Diode 34 is connected between terminals 39 and 25 with the diode poled for easy current flow toward terminal 25. Finally, resistor 33 is connected between terminal 25 and a point of ground potential.

In normal operation, that is when neither diode 26 nor 27 is conducting, currents flow from direct-current source 30 through diodes 29 and 35 to direct-current source 31. With 0.5 volt drops across diodes 29 and 35, the potentials at terminals 38 and 39 are each 3.5 volts. The input to comparator terminal 24 is therefore normally 3.5 volts. The positive potential at terminal 39 causes a current to flow through diode 34 and resistor 33. With a 0.5 volt drop across diode 34, the voltage appearing at terminal 25 is 3 volts. With the voltage level on terminal 24 exceeding that on terminal 25, the comparator produces its ZERO output.

When a voltage less than 2.5 volts is applied to terminal 20, diode 26 conducts and, with a 0.5 volt drop thereacross, a voltage less than 3 volts appears at terminal 24. At this time diode 29 is nonconducting. Furthermore, as the voltage on terminal 24 is now less than that on terminal 25, voltage comparator 23 produces its ONE state output. On the other hand, when the voltage applied to terminal 20 does not cause diode 26 to conduct, but a voltage in excess of 4 volts is applied to terminal 21, diode 27 conducts and the potential on terminal 25 increases to a voltage in excess of 3.5 volts. In this case diode 34 no longer conducts and, furthermore, the potential on terminal 25 exceeds that on terminal 24. Once again voltage comparator 23 produces its ONE state output. Finally, the ONE state is also produced when a voltage less than 2.5 volts is applied to terminal 20 and a voltage in excess of 4 volts is applied to terminal 21. These three conditions are identified as cases 2, 3, and 4, respectively, in the truth table of FIG. 2. Case 1 shown in the table is that occurring when neither of diodes 26 and 27 is forward biased.

Embodiments of the invention may be used as overvoltage and undervoltage detection circuits. This may be readily appreciated by again referring to FIG. 1 which shows a voltage divider comprising serially connected resistors 40, 41, and 42 connected to receive a positive voltage appearing on a terminal 43. The higher voltage at the junction between resistors 40 and 41 is applied to input terminal 20 while the lower voltage at the junction between resistors 41 and 42 is applied to input terminal 21. One of the factors involved in choosing the values of resistors 40, 41, and 42 is that the voltages at these junctions must not forward bias either of diodes 26 and 27 as long as the voltage at terminal 43 remains within its desired operating range. A second factor in choosing these values is that the voltage at the junction between resistors 41 and 42 must forward bias diode 27 when the voltage at terminal 43 exceeds the upper limit of its desired operating range. A third factor is that the voltage at the junction of resistors 40 and 41 must forward bias diode 26 when the voltage at terminal 43 falls below the lower limit of its desired operating range. With this in mind, one skilled in the art may readily set up three simultaneous equations and solve the same for obtaining values for resistors 40, 41, and 42.

Embodiments of the invention are not restricted to the disclosed one. The reference voltage sources, for example, may supply voltages having a difference greater than 0.5 volt to comparator terminals 24 and 25. Replacing diode 29 with two serially connected diodes each having a 0.5 volt drop, for example, raises the potential at terminal 24 to 4 volts, thus doubling the reference voltage drop between terminals 24 and 25. As another example, the reference voltage difference is doubled by replacing diode 34 with two serially connected diodes each having a 0.5 volt drop. Still another example involves providing the reference voltage sources with separate direct-current sources of differing values. These and other techniques for applying different valued reference voltages to terminals 24 and 25 are apparent to those skilled in the art.

It should also be noted that embodiments of the invention may be used for monitoring negative valued voltages by reversing the poling of the diodes and also reversing the direct-current sources.

Finally, it should be noted that embodiments may be used when a single condition (i.e., either an overvoltage or undervoltage condition) is to be detected. In such a use, either terminal 20 or terminal 21 (depending on the condition to be detected) is left unconnected.

What is claimed is:

1. A logic circuit comprising, a direct-current source, first and second series circuits each comprising a resistor and a diode and, furthermore each connected in a forward conducting sense across said source with said diodes connected to the same point on said source, a voltage comparator having first and second input terminals and an output terminal, a direct-current path connected between said comparator first input terminal and the junction between the resistor and the diode of said first series circuit, a third diode connected between said comparator second input terminal and the junction between the resistor and the diode of said second series circuit with said third diode having the same type of electrode terminal connected to said second series circuit junction as the diode in said second series circuit, first and second input terminals for said logic circuit, a fourth diode connected between said logic circuit first input terminal and said comparator second input terminal with said fourth diode having the same type of electrode terminal connected to said comparator second input terminal as said third diode, and a fifth diode connected between said logic circuit second input terminal and said comparator first input terminal with said fifth diode having the same type of electrode terminal connected to said comparator first input terminal as the diode in said first series circuit.

2. A logic circuit comprising, a bridge circuit comprising first, second, third, and fourth terminals with a first resistor connected between said first and second terminals, a second resistor connected between said first and third terminals, a first diode connected between said second and fourth terminals, and a second diode connected between said third and fourth terminals, where said diodes have the same type of electrode terminal connected to said fourth terminal, a direct-current source connected to said first and fourth terminals in a polarity sense to cause a current to flow through said first and second diodes, a voltage comparator having first and second input terminals and an output terminal, a direct-current path connected between said comparator first input terminal and said bridge circuit second terminal, a third diode connected between said bridge circuit third terminal and said comparator second input terminal with said third diode having the same type of electrode terminal connected to said bridge circuit third terminal as said second diode, first and second input terminals for said logic circuit, a fourth diode connected between said logic circuit first input terminal and said comparator second input terminal with said fourth diode having the same type of electrode terminal connected to said comparator second input terminal as said third diode, and a fifth diode connected between said logic circuit second input terminal and said comparator first input terminal with said fifth diode having the same type of electrode terminal connected to said comparator first input terminal as said first diode.

* * * * *